United States Patent [19]
Kobayashi

[11] Patent Number: 5,172,352
[45] Date of Patent: Dec. 15, 1992

[54] LASER RECORDING/REPRODUCING APPARATUS FOR AN OPTICAL DISK HAVING A DRIVING CIRCUIT FOR MAINTAINING A SERVO SIGNAL AT A PREDETERMINED LEVEL

[75] Inventor: Seiji Kobayashi, Kanagawa, Japan

[73] Assignee: Sony Corporation, Tokyo, Japan

[21] Appl. No.: 566,468

[22] PCT Filed: Dec. 13, 1989

[86] PCT No.: PCT/JP89/01250
§ 371 Date: Aug. 15, 1990
§ 102(e) Date: Aug. 15, 1990

[87] PCT Pub. No.: WO90/07179
PCT Pub. Date: Jun. 28, 1990

[30] Foreign Application Priority Data
Dec. 16, 1988 [JP] Japan .................................. 63-318158

[51] Int. Cl.$^5$ .............................................. G11B 7/00
[52] U.S. Cl. .................................... 369/44.26; 369/54; 369/116
[58] Field of Search ........................... 369/53-58, 369/116, 109, 44.25, 44.26-44.34

[56] References Cited

U.S. PATENT DOCUMENTS
4,796,250  1/1989  Kobayashi et al. ................... 369/54

FOREIGN PATENT DOCUMENTS
0256827A2  2/1988  European Pat. Off. .

Primary Examiner—Robert L. Richardson
Attorney, Agent, or Firm—Philip M. Shaw, Jr.

[57] ABSTRACT

An optical disc recording/reproducing apparatus by which data is recorded and/or reproduced with a laser beam scanning an optical disc provided with recording tracks ($TK_s$), each of the recording tracks ($TK_s$) being composed of a data recording area (DA) and a servo area (SA) having tracking pits ($Q_A$) and ($Q_B$), characterized in that the apparatus is provided with a driving circuit (35) for driving a laser (11) for irradiating the recording track (TK) with a laser beam, detecting means (12) for detecting light obtained by reflection of the laser beam by the recording track (TK), and laser output controlling means (18) and (33) for sampling-and-holding the output from the detecting means (12), detecting the difference between the levels of outputs of the tracking pits ($Q_A$) and ($Q_B$) and of a pitless portion (1), and controlling the driving circuit (35) so that the difference may be equal to a target value.

2 Claims, 3 Drawing Sheets

LASER RECORDING/REPRODUCING APPARATUS FOR AN OPTICAL DISK HAVING A DRIVING CIRCUIT FOR MAINTAINING A SERVO SIGNAL AT A PREDETERMINED LEVEL

TECHNICAL FIELD

This invention relates to a recording/reproducing apparatus for an optical disk in which a recording track on which a data record area and a servo area having tracking data pits formed therein are formed in spatial isolation from each other is scanned with a laser light to effect data recording/reproduction on or from the recording track.

BACKGROUND ART

In general, the recording track on the optical disk is scanned by a laser light to effect data recording or reproduction while, as the optical disk is rotationally driven at a constant angular velocity or at a constant linear velocity, a focusing servo or a tracking servo is applied to an optical head having enclosed therein a laser diode driven by a laser driving circuit to output the laser light for data recording or reproduction, a photodetector for detecting the reflected laser light from the optical disk, or the like.

On the other hand, similarly to the so-called sector servo for a magnetic disk, a so-called sampled servo technique has been proposed, according to which a recording track in the form of concentric circles or a helix on the optical disk is spatially divided into a servo area and a recording area, tracking data pits or the like are previously formed or preformed in the servo area as servo signals at a predetermined interval or angle, and in which these discrete servo signals are sample-held when the disk is rotationally driven to perform a continuous servo control.

In addition, with the recording/reproducing apparatus for an optical disk in which the recording track is scanned by the laser light to perform data recording and reproduction, if the light beam power is too low during recording, data cannot be recorded reliably, whereas, if the light beam power is too high during reproduction, data recorded on the recording track may be destroyed or otherwise affected seriously. Thus, as disclosed for example in the Japanese Patent Publication No. 53-46633 (1988), it has been customary to detect the volume of the laser light for data recording and reproduction and to switch a so-called automatic power control (referred to hereinafter as APC), servo loop, which performs a feedback control of a driving circuit of a laser diode outputting the laser light to maintain a constant light beam power, as a function of the operating modes, to make a proper switching of the laser beam power.

On the other hand, the recording/reproducing apparatus for an optical disk may exhibit different characteristics, such as reflectivity or modulation factors, depending on the type of the recording medium, that is, the optical disk, such that the input signal to a servo system, such as the focusing servo or tracking servo system, may vary from one optical disk to another, so that desired servo characteristics may not be obtained. Hence, with the conventional recording/reproducing apparatus for an optical disk, as shown in FIG. 1, the playback RF signals detected by an optical head 50 are supplied from a preamplifier 51 to a servo circuit 53 via variable gain amplifier 52 so that desired servo characteristics will be obtained by the servo circuit 53 through automatic gain control or so-called AGC of the variable gain amplifier 52.

In the conventional recording/reproducing apparatus for an optical disk, shown in FIG. 1, a spindle servo is applied to an optical disk 54 so that the disk is rotationally driven by a spindle motor 55 so that the disk is rotated at, for example, a constant angular velocity. The optical head 50 also has enclosed therein a laser diode which is driven by a laser driving circuit 56 to output a laser light for data recording or reproduction, a photodetector for detecting the reflected laser high from the optical disk 54, and so forth. The light volume of the laser light output from the laser diode is feedback-controlled by an APC circuit 57 so that the output light volume of the laser diode will be constant and, with the focusing servo and the tracking servo being applied by the servo circuit 53, the recording track on the optical disk 54 is scanned by the laser light to perform data recording/reproduction.

The detection output of the photodetector detecting the reflected laser light from the optical disk, that is the RF playback signals detected by the optical head 50, is supplied via preamplifier 51 to the variable gain amplifier 52 and from the variable gain amplifier 52 to the servo circuit 53 and to a clock regenerating circuit 60, while being supplied via sample hold circuit 61 to an automatic gain control circuit 62.

The clock regenerating circuit 60 extracts clock components contained in the playback RF signals supplied via variable gain amplifier 52 by so-called PLL to perform clock detection to produce various clocks necessary to perform system control.

The sample-hold circuit 61 processes the playback RF signals, supplied via variable gain amplifier 52, by sample-holding modulated outputs A and B by tracking data pits $Q_A$ and $Q_B$ previously recorded in a servo area SA of a recording track TK of the optical disk 54, and an unmodulated output C, obtained between the tracking data pit $Q_B$ and the clock data pit $Q_C$, and by supplying the outputs A to C to the automatic gain control circuit 62.

The automatic gain control circuit 62 processes the playbackRF signals output via variable gain amplifier 52 by controlling the gain of the variable gain amplifier 52 on the basis of the sample-held outputs A to C by the sample-hold circuit 62 so that the sum of the modulation factors by the tracking data pits $Q_A$ and $Q_B$ will be constant. Meanwhile, write pulses consistent with record data are supplied to the laser drive circuit 60 during the record mode operation from a recording block 59.

Meanwhile, in order to perform automatic gain control (so-called AGC) of the detection output by the optical head 50, as in the case of the conventional recording/reproducing apparatus for an optical disk shown in FIG. 1, it is required of the variable gain amplifier 52 to have frequency characteristics of extremely broad bandwidth, such as 0 to about 6 MHz, as well as satisfactory characteristics, such as DC offset, drift or S/N ratio. The variable gain amplifier satisfying these various properties are usually costly and bulky in size so that they are not suited to an ultra-small size optical disk system employing a 5- or 3- inch size optical disk.

In view of the above described status of the art, it is an object of the present invention to provide a recording/reproducing apparatus for an optical disk in which a recording track on which a data record area and a servo area having tracking data pits formed therein are formed in spatial isolation from each other is scanned by a laser light to record or reproduce data on or from the recording track, and which is inexpensive and simple in structure. Thus the present invention provides a recording/reproducing apparatus for an optical disk in which servo signals detected from the servo area may be maintained at a predetermined signal level by a simplified circuit construction.

DISCLOSURE OF THE INVENTION

For accomplishing the above object, the present invention provides a recording/reproducing apparatus for an optical disk in which a recording track of an optical disk including a data record area and a servo area having tracking pits is scanned with a laser beam to effect data recording on or from said recording track, said apparatus comprising laser output control means wherein the output of photodetector means detecting the laser light scanning said recording track and-reflected by said recording track is sample-hold, the level difference between the detection output level of the tracking data pits in said servo area and the detection output level of a pitless area, and wherein a drive circuit for a laser light source outputting said laser light is driven so that the level difference will be equal to a target value, whereby the servo signal detected from the servo area may be maintained at a predetermined signal level.

With the recording/reproducing apparatus for an optical disk according to the present invention, the recording track on which the data record area and the servo area having tracking data pits formed therein are formed in spatial isolation from each other is scanned by the laser light output from the laser light source. The laser output control means sample-hold the output of photodetector means detecting the laser light from the laser light source which is reflected by the recording track and control the driving circuit for the laser light source so that the difference between the detection output level for the tracking data pits of the servo area and the detection output level for the pitless area will be equal to a target value. In this manner, the servo signal detected by the servo area as the output of the photodetector means may be maintained at a predetermined signal level.

BEST EMBODIMENT FOR PRACTICISING THE INVENTION

Figure 1:
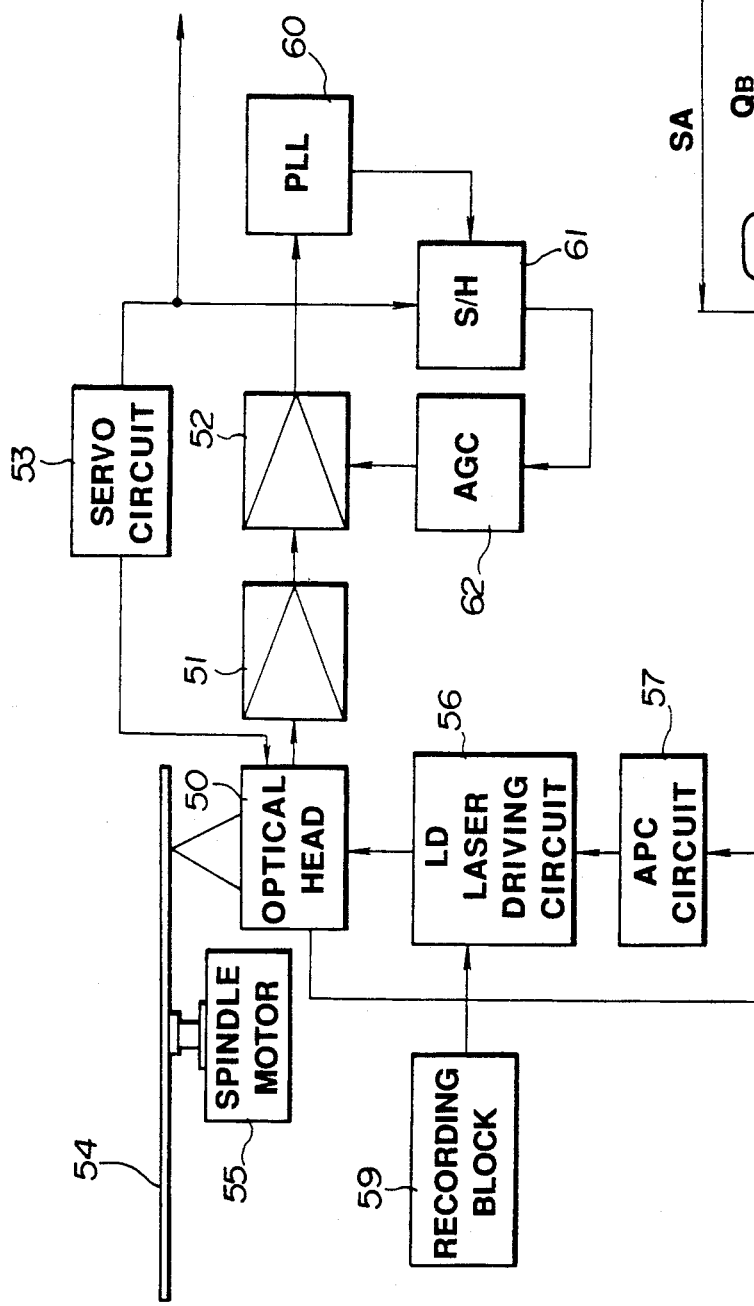
FIG. 1 is a block diagram showing essential portions of a conventional recording/reproducing apparatus for an optical disk.
Figure 2:
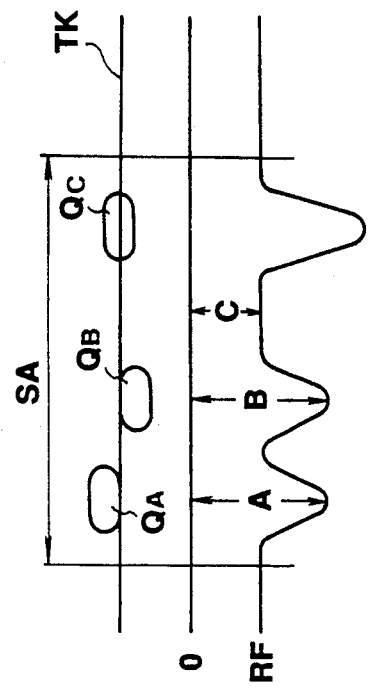
FIG. 2 is a diagrammatic view for illustrating an automatic gain control operation in the above recording/reproducing apparatus.

A preferred embodiment of the present invention will be hereinafter explained by referring to the drawings.

Figure 3:
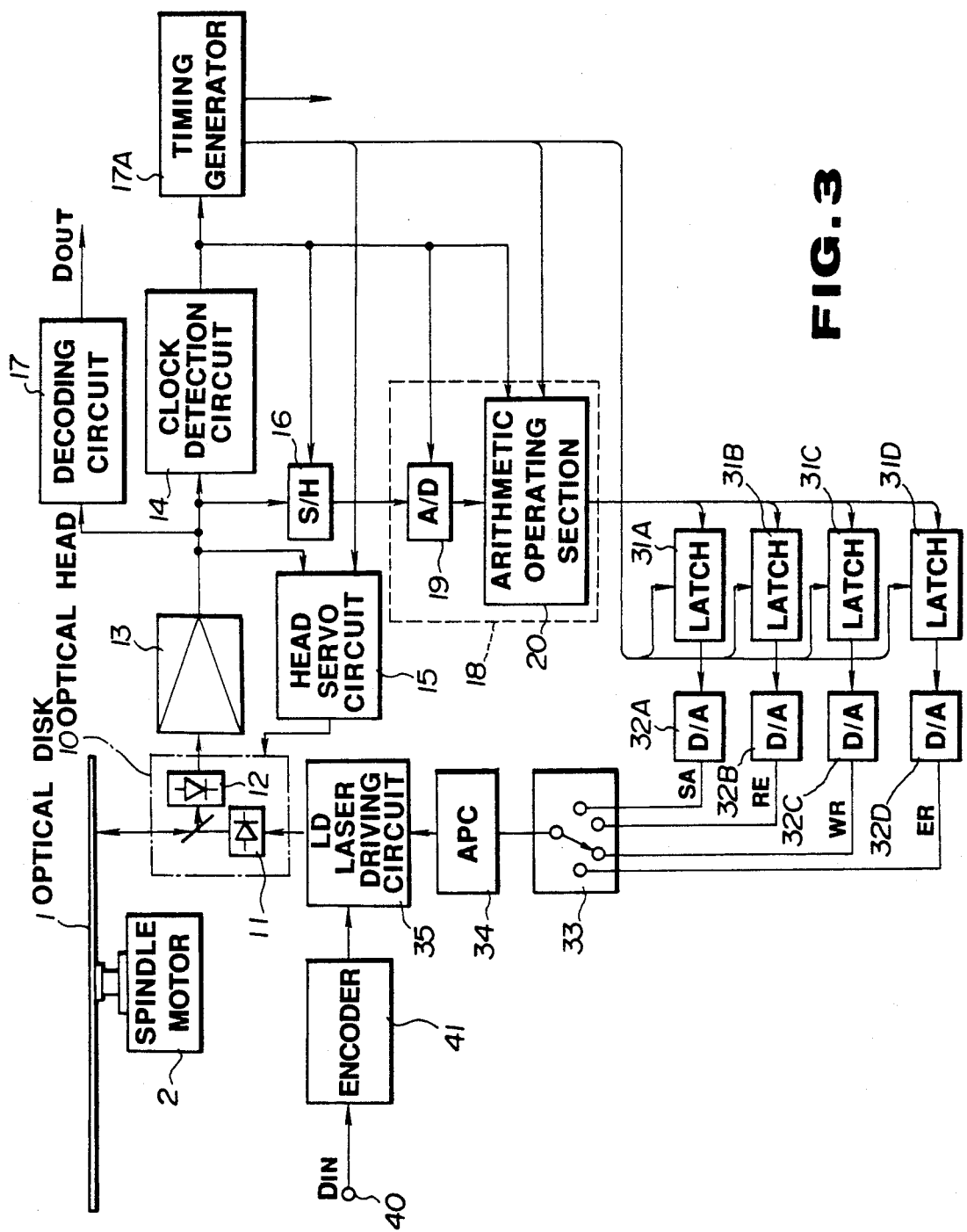
FIG. 3 is a block diagram showing essential portions of a recording/reproducing apparatus according to the present invention.

The block diagram of FIG. 3 shows an arrangement of a recording/reproducing apparatus for an optical disk in which an optical disk 1 constituted by an erasable and rerecordable magneto-optical recording medium is rotationally driven by a spindle motor 2 at a constant angular velocity for scanning the recording track on the optical disk with a laser light from an optical head 10 to effect optical recording/reproduction of digital data in a data format consistent with the standards for a so-called compact disk.

Figure 4:
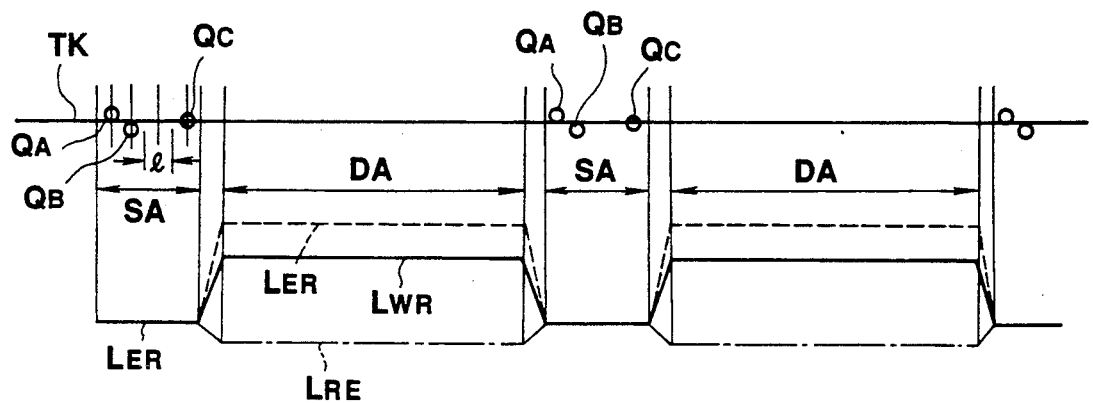
FIG. 4 is a diagrammatic view for illustrating the laser power control operation in the above recording/reproducing apparatus.

The optical disk 1 employed in the recording/reproducing apparatus for an optical disk is constituted by a sampled servo system and, as shown in FIG. 4, has a track format in which the recording track TK is divided at an interval of a predetermined rotational angle so that it is spatially separated into a data recording area DA and a servo area SA. In the servo area SA, tracking data pits $Q_A$ and $Q_B$ which are offset on the radially inner and outer sides of a track centerline and a clock data pit $Q_C$ on the track centerline are arrayed substantially along the track centerline at predetermined distances from one another, while a pitless area is formed between the tracking data pit $Q_B$ and the clock data pit $Q_C$.

The optical head 10 in the recording/reproducing apparatus for the optical disk has enclosed therein a laser diode11 driven by a laser driving circuit 35 to output a laser light for data recording/reproduction, a photodiode 12 for detecting the laser light radiated by the laser diode 11 and reflected by the optical disk 1, or the like, and performs data recording/reproduction on or from the recording tracks on the optical disk 1 by scanning the recording tracks on the optical disk 1 by the laser light output from the laser diode 11. By scanning the recording track on the optical disk 1 by the laser light output by the laser diode 11, a detection output is obtained by the photodetector 12, that is the playback RF signals, and is supplied from a preamplifier 13 to a clock detection circuit 14, a head servo circuit 15, a sample-hold circuit 16 and to a decoding circuit 17 for data reproduction.

The clock detection circuit 14 performs clock detection by so-called PLL on the basis of the detection output of the clock data pit $Q_C$ contained in the playback RF signal supplied from the optical head 1 to produce bit clocks. The bit clocks obtained by the clock detection circuit 14 are supplied to the head servo circuit 15 and to the sample-hold circuit 16, while being supplied to a timing generator 17A and to a system control micro-computer 18. On the other hand, the timing generating circuit 17A forms, on the basis of the above bit clocks, system clocks for synchronization of the overall system and latch timing clocks.

The head servo circuit 15 controls a biaxial actuator, not shown, for driving an objective lens of the optical head 1 to perform a tracking servo and a focusing servo on the basis of the playback RF signals supplied from the optical head 1. Thus the head servo circuit 15 performs the tracking control by detecting tracking errors on the basis of the detection output of the tracking data pits $Q_A$ and $Q_B$, while performing the focusing control by detecting focusing errors on the basis of the detection output of the pitless area between the tracking data pit $Q_B$ and the clock data pit $Q_C$.

The micro-computer 18 has enclosed therein an analog/digital (A/D) converter 19 for digitizing the playback RF signals supplied by the optical head 1 via sample-hold circuit 16. The micro-computer processes, in its arithmetic operating section 20, the detection RF data digitized by the A/D converter 19 to form laser light control data $D_{SA}$ with respect to the servo area SA on the optical disk 1 and laser light control data $D_{ER}$, $D_{WR}$ and $D_{RE}$ for the erasure, recording and reproducing modes with respect to the data area DA.

Figure 5:
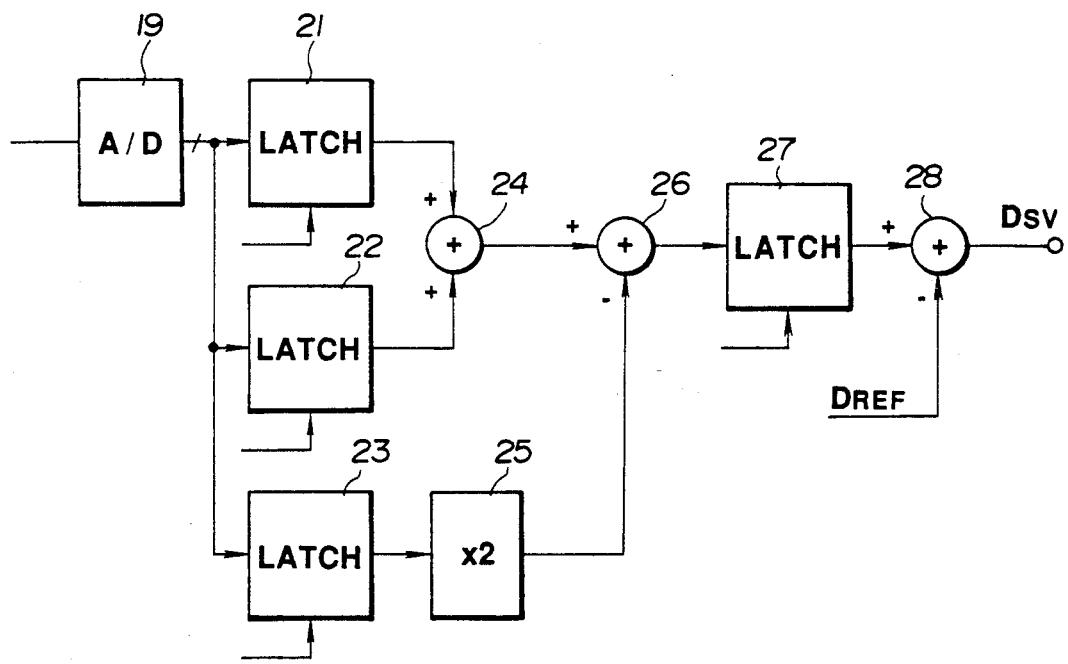
FIG. 5 is an equivalent circuit diagram of a forming and processing section for control data for a laser light irradiated on a servo area of the above optical disk in a micro-computer constituting the recording/reproducing apparatus.

The formation by the micro-computer 18 of the laser light control data $D_{SA}$ with respect to the servo area SA is hereinafter explained. Referring to FIG. 5 showing the arithmetic operating constitution by an equivalent circuit, processes playback RF data digitized by the A/D converter 19 by latching the detection output level of the tracking data pits $Q_A$ and $Q_B$ of the servo area SA by first and second latching circuits 21, 22, and simultaneously latching the playback output level of the pitless area 1 between the clock data pit $Q_C$ and the tracking data pits $Q_B$ in the servo area SA by a third latching circuit 23. The latch output levels by the first and second latching circuits 21, 22, that is the detection output levels of the tracking data pits $Q_A$ and $Q_B$, are summed at a summing point 24 before being supplied to a first subtractor 26. On the other hand, the latch output by the third latching circuit 23, that is the detection output level of the pitless area 1, is multiplied by two in a multiplier 25 before being supplied to the first subtractor 26. The first subtractor 26 computes the modulation factor of the laser light by the tracking data pits $Q_A$ and $Q_B$ by subtracting the signal level from the multiplier 25 which is twice the detection output level of the pitless area 1 from the sum of the playback output levels of the tracking data pits $Q_A$ and $Q_B$ obtained from the summing point 24. The subtraction output data obtained at the first subtractor 26, that is the modulation factor data, are supplied via a fourth latching circuit 27 to a second subtractor 28.

The second subtractor 28, to which reference modulation factor data $D_{REF}$ with respect to the servo area SA of the optical disk 1 are supplied, forms modulation factor error data by subtracting the reference modulation factor data $D_{REF}$ from the measured modulation factor data latched by the fourth latch circuit 27, and outputs the modulation factor error data as the laser light control data $D_{SA}$ with respect to the servo area SA.

The laser light control data $D_{SA}$ with resepct to the servo area SA, obtained by the micro-computer 18, are supplied from a latching circuit 31A to a digital/analog (D/A) converter 32A where it is converted into corresponding analog signals which are then transmitted via a loop changeover switch 33 to an automatic output control (APC) circuit 34 of the laser driving circuit 35.

By the operation of the APC circuit 34, which is based on the control data $D_{SA}$, the power $L_{SA}$ of the laser light irradiated on the servo area SA of the optical disk 1 from the laser diode 11 of the optical head 10 is controlled to a constant value.

With the power $L_{SA}$ of the laser light irradiated on the servo area SA of the optical disk 1 from the laser diode 11 of the optical head 10 thus maintained to a constant value by the operation of the APC circuit 34 which is based on the above control data $D_{SA}$, the micro-computer 18 computes, on the basis of the detection output level of the pitless area 1 between the clock data pit $Q_C$ and the tracking data pit $Q_B$ of the servo area SA, error data with respect to the reference power data $L_{ER}$, $L_{WR}$ and $L_{RE}$ for the erasure, recording and reproducing modes of the laser light irradiated on the data area DA, respectively, as control data $D_{ER}$, $D_{WR}$ and $D_{RF}$, respectively.

The control data $D_{ER}$, $D_{WR}$ and $D_{RE}$, obtained by the micro-computer 18, are supplied from latching circuits 31B, 31C, 31D to digital/analog (D/A) converters 31B, 31C, 31D and converted into analog signals by the D/A converters 32B, 32C, 32D. These signals are then supplied to the automatic output control (APC) circuit 34 of the laser driving circuit 35 via loop changeover switch 33 as a function of the prevailing operating mode.

Meanwhile, during the recording mode, record data $D_{IN}$ is supplied as record timing pulse to the laser driving circuit 35 at data input terminal 40 via encoder 41, so that the laser driving circuit will drive the laser diode 11 of the optical head 10 with pulses as a function of the record data $D_{IN}$ to effect recording on the recording track TK of the optical disk 1. The decoder 17 decodes the playback output from the optical head 10 in a manner corresponding to the encoding at the encoder 41 to constitute playback data $D_{OUT}$.

In this manner, by spatially separating the recording track TK on the optical disk 1 of the sampled servo system into the servo area SA and the data area DA, separately controlling the power of the laser beam irradiated on the servo area SA and that on the data area DA and by actuating the APC circuit 34 so that the servo signal of a predetermined level will be detected from the servo area SA, it become unnecessary to provide the AGC circuit in the servo signal reproducing system.

In this manner, with the recording/reproducing apparatus for the optical disk according to the present invention, the recording track on which the data record area and the servo area including the tracking pits are formed in spatial isolation from each other is scanned by the laser light output from the laser light source, the output of photodetecting means detecting the laser light output by the laser light source and reflected by the recording track is sample-held by laser output control means, and the driving circuit for the laser light source is controlled so that the level difference between the detection output level of the tracking pits in the servo area and the detection output level of the pitless area will be equal to a target value. Thus the servo signal detected from the servo area as the output of the photodetecting means may be maintained at a predetermined signal level.

Hence, in accordance with the present invention, the necessity of performing automatic gain control of the detection output of the optical head with the aid of a variable gain amplifier of a broad bandwidth, as in the conventional recording/reproducing apparatus for the optical disk, is eliminated, so that the circuit arrangement may be remarkably simplified with reduction in size and costs.

What is claimed is:

1. A recording/reproducing apparatus for an optical disk in which a recording track of an optical disk including a data record area and a servo area having tracking pits formed therein is scanned with a laser beam to effect data recording on or from the recording track, the apparatus comprising a driving circuit for driving a laser light source to irradiate the laser beam on the recording tack, detection means for detecting the reflected light by the recording track of the laser beam scanning the recording track, laser output control means for sample-holding a detection output by the detection means and detecting a level difference between a detection output level for the tracking pits of the servo area and a detection output level for a pitless area, the laser output control means controlling the driving circuit so that the level difference is equal to a target value, wherein the laser output control means controls the driving circuit as a function of a prevailing operating mode of the recording/reproducing apparatus and includes sample-hold means for sample-holding the detection output from the detection means, signal processing means for detecting, from an output of the sample-holding means, the level difference between the detection output level for the tracking pits in the servo area and the detection output level for the pitless area, and control means for controlling the driving circuit on the basis of an output from the signal processing means so that the level difference will be equal to the target value, and wherein the signal processing means computes modulation factor data of the laser beam from the detection output level for the tracking pits and the detection output level for the pitless area and compares the modulation factor data with reference modulation factor data to form modulation factor error data to output control data for controlling the driving circuit.

2. The recording/reproducing apparatus for an optical disk according to claim 1, wherein the laser output control means comprises latching means for latching an output from the signal processing means, switching means for switching an output from the latching means as a function of the operating mode of the recording/reproducing apparatus, and automatic output control means for controlling an output from the driving circuit on the basis of the output from the latching means via the switching means.

* * * * *